:::: {.columns}
::: {.column}
(12) United States Patent
Humphries et al.

(54) METHOD AND SYSTEM FOR TRACKED DEVICE LOCATION AND ROUTE ADHERENCE VIA GEOFENCING

(75) Inventors: Laymon Scott Humphries, Clinton, MS (US); Huey-Jiun Ngo, Flowood, MS (US)

(73) Assignee: MCI, LLC, Basking Ridge, NJ (US)

( * ) Notice: Subject to any disclaimer, the term of this patent is extended or adjusted under 35 U.S.C. 154(b) by 282 days.

(21) Appl. No.: 10/758,213

(22) Filed: Jan. 16, 2004

(65) Prior Publication Data

US 2005/0159883 A1 Jul. 21, 2005

(51) Int. Cl.
G01C 21/26 (2006.01)
(52) U.S. Cl. .................. 701/207; 701/214; 340/426.19; 340/426.22; 340/995.21; 342/357.07
(58) Field of Classification Search .................. 701/1, 701/2, 200–202, 207–214; 340/425, 426.1, 340/426.11, 426.12, 426.16, 426.18, 426.19, 340/426.22, 438, 573.1, 573.4, 825.36, 357.07, 340/995.21; 342/357.06, 357.07
See application file for complete search history.

(56) References Cited

U.S. PATENT DOCUMENTS 5,532,690 A * 7/1996 Hertel .................. 340/989
5,870,029 A * 2/1999 Otto et al. ............. 340/825.36
:::
::: {.column}
(10) Patent No.: US 7,164,986 B2
(45) Date of Patent: Jan. 16, 2007

| | | | |
|---|---|---|---|
| 6,295,492 B1 | 9/2001 | Lang et al. ................. 701/33 |
| 6,611,740 B1 | 8/2003 | Lowrey et al. ............ 701/29 |
| 6,636,790 B1 | 10/2003 | Lightner et al. .......... 701/33 |
| 6,732,031 B1 | 5/2004 | Lightner et al. .......... 701/33 |
| 6,754,583 B1 | 6/2004 | Verbil ...................... 701/213 |
| 6,983,202 B1* | 1/2006 | Sanqunetti ............... 701/207 |
| 2002/0164993 A1* | 11/2002 | Elliot ...................... 455/456 |
| 2003/0030561 A1* | 2/2003 | Yafuso et al. ............ 340/573.4 |
| 2004/0203867 A1* | 10/2004 | Schmidt .................. 455/456.1 |
| 2004/0219932 A1* | 11/2004 | Verteuil .................. 455/456.2 |

OTHER PUBLICATIONS

"Application Note—Geofence Setup", www.absolute.co.nz/technotes/world/geofences.doc, last modified Feb. 3, 2000.

* cited by examiner

*Primary Examiner*—Gertrude A. Jeanglaude

(57) ABSTRACT

A device tracking location adherence and route adherence technology, is disclosed that at least provides a tracked device receiving, a set of coordinates associated with a boundary area, and obtaining a position of the tracked device. Based upon the received coordinates and the detected position of the tracked device, a determination is made as to whether the tracked device is located inside the boundary area or outside the boundary area. An alert signal is then generated and transmitted if the result of the determining is different from an immediately previous obtained result. The system allows, for example, drastic reduction in the amount of data traffic required within a system since the tracked device performs much of the necessary processing. This is especially advantageous where a fleet of tracked devices are employed within a network.

20 Claims, 12 Drawing Sheets
:::
::::

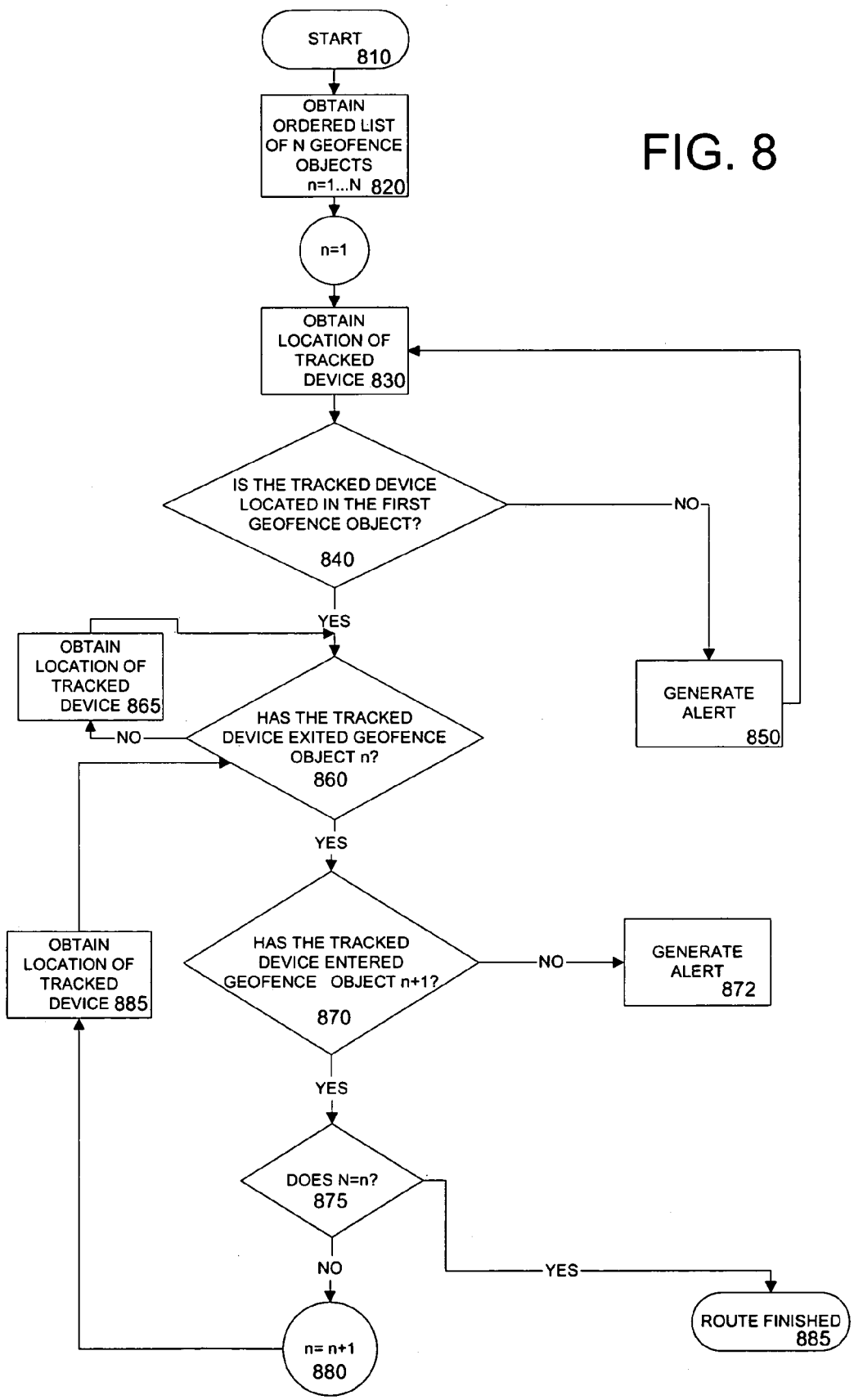

METHOD AND SYSTEM FOR TRACKED DEVICE LOCATION AND ROUTE ADHERENCE VIA GEOFENCING

BACKGROUND OF THE INVENTION

1. Field of the Invention

The present invention generally relates to device tracking, and more particularly to methods and associated systems for ensuring location adherence for a tracked device as well as ensuring route adherence by employing geofencing techniques.

2. Background

The efficient tracking of objects (including people, vehicles, fleets of cargo, etc.) has been a long term goal of many different areas of society. With the increased processing capabilities of today's computer processors as well as the continued advancement within the communications industry, one would assume that device tracking would have become quite pedestrian in nature. To the contrary, accompanying the swift advancement of the above-described technologies is the reality that some basic goals of object tracking have yet to be achieved.

For example, one area within device tracking that continues to need refinement is the manner in which information relating to tracked devices is optimally obtained and managed. More specifically, fleet management businesses are currently hindered by the amount of network resources and associated hardware that are required to support a fleet of tracked devices that have constant data requirements. Also, these fleets of tracked devices are also required to provide information back to a data center on a nearly continuous basis. Normally, systems employ a network data center that continuously receives data from tracked devices and employs various location determination schemes to track an object's location. While this may not seem like much of a burden, if the number of tracked devices is large (e.g., one hundred or more), each tracked device providing continuous updates would require a very large network. The associated costs to build and maintain such a network would become prohibitive.

Additionally, the algorithms that support device tracking have not developed to the point at which they can be used efficiently. For example, while geofencing has been utilized within the device location industry in an effort to efficiently depict areas in which tracked objects are to be confined, the development of this technology has been slow, and the systems have been comparatively primitive with regard to the various abilities of the individual applications.

Furthermore, networks supporting this type of operation are further burdened by inherent variations in location detection (e.g., Global Positioning Systems (GPS), triangulation systems, etc.). These inherent variations, caused by anything from rounding errors in the calculation of position to changes in whether, cause slight variations in the determined position of a tracked device. For example, if a stationary object's position is determined by a GPS system three separate times, there would likely be three slightly different results. If used within a position or route adherence system, these inherent variations can cause numerous problems.

SUMMARY

Therefore, there is a need for methods and systems that optimally monitor the location of devices and that address the above-noted problems by providing a system that is simple to use, and that does not require large and expensive networks.

Exemplary embodiments of the present invention are directed to a method and an apparatus for performing location analysis within a tracked device. At the tracked device, a set of coordinates is received and associated with a boundary area. A position of the tracked device is obtained at the tracked device. Based upon the received coordinates and the detected position of the tracked device, it is determined whether the tracked device is located inside the boundary area or outside the boundary area. Next, an alert signal is generated and transmitted if the result of the determining step is different from an immediately previous result obtained.

Other exemplary embodiments of the present invention are directed to a method and an apparatus for performing route progress analysis within a tracked device. At the tracked device a plurality of sets of coordinates associated with a plurality of boundary areas are received, wherein the plurality of sets of coordinates have a predetermined order. At the tracked device, a position of the tracked device is obtained. Based upon the predetermined order of the sets of coordinates and the detected position of the tracked device, it is determined whether the tracked device is progressing through the plurality of boundary areas in accordance with the predetermined order. Next, an alert signal is generated and transmitted if the tracked device is not progressing though the in accordance with the predetermined order.

Additional exemplary embodiments of the present invention are directed to a method and an apparatus for remotely tracking a tracked device. Boundary information is received and the boundary information is sent to the tracked device. An alert is received from the tracked device regarding the location of the tracked device, wherein the boundary information includes coordinates that define geo-fence boundaries comprising a combination of circles and polygons.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 8 is a flowchart describing a route adherence application in accordance with an exemplary embodiment of the present invention;

DETAILED DESCRIPTION

Exemplary embodiments of the present invention relate to object location adherence, route adherence and alert generation based upon the location or route of the tracked object. Although specific embodiments will be illustrated and described herein, it should be appreciated by those of ordinary skill in the art that any arrangement, which is calculated to achieve the same purpose, may be substituted for the specific embodiment shown herein. This application is intended to cover any adaptations or variations of the present invention that generally relate to systems, methods and an apparatuses regarding object location adherence and route adherence determination and reporting.

The device tracking location adherence and route adherence technology, according to an exemplary embodiment of this invention, at least provides a tracked device receiving, a set of coordinates associated with a boundary area, and obtaining a position of the tracked device. Based upon the received coordinates and the detected position of the tracked device a determination is made as to whether the tracked device is located inside the boundary area or outside the boundary area. An alert signal is then generated and transmitted if the result of the determining is different from an immediately previous obtained result. The system allows, for example, drastic reduction in the amount of data traffic required within a system since the tracked device performs much of the necessary processing. This is especially advantageous where a fleet of tracked devices are employed within a network.

In the following detailed description of the exemplary embodiments, reference is made to the accompanying drawings that form part hereof, and in which is shown by way of illustration, specific exemplary embodiments in which the invention may be practiced. These embodiments are described in sufficient detail to enable those skilled in the art to practice the invention, and it is to be understood that other embodiments may be utilized and that logical, mechanical and/or electrical changes may be made without departing from the spirit and scope of the present invention. The following detail description is therefore not to be taken in a limiting sense.

Figure 1:
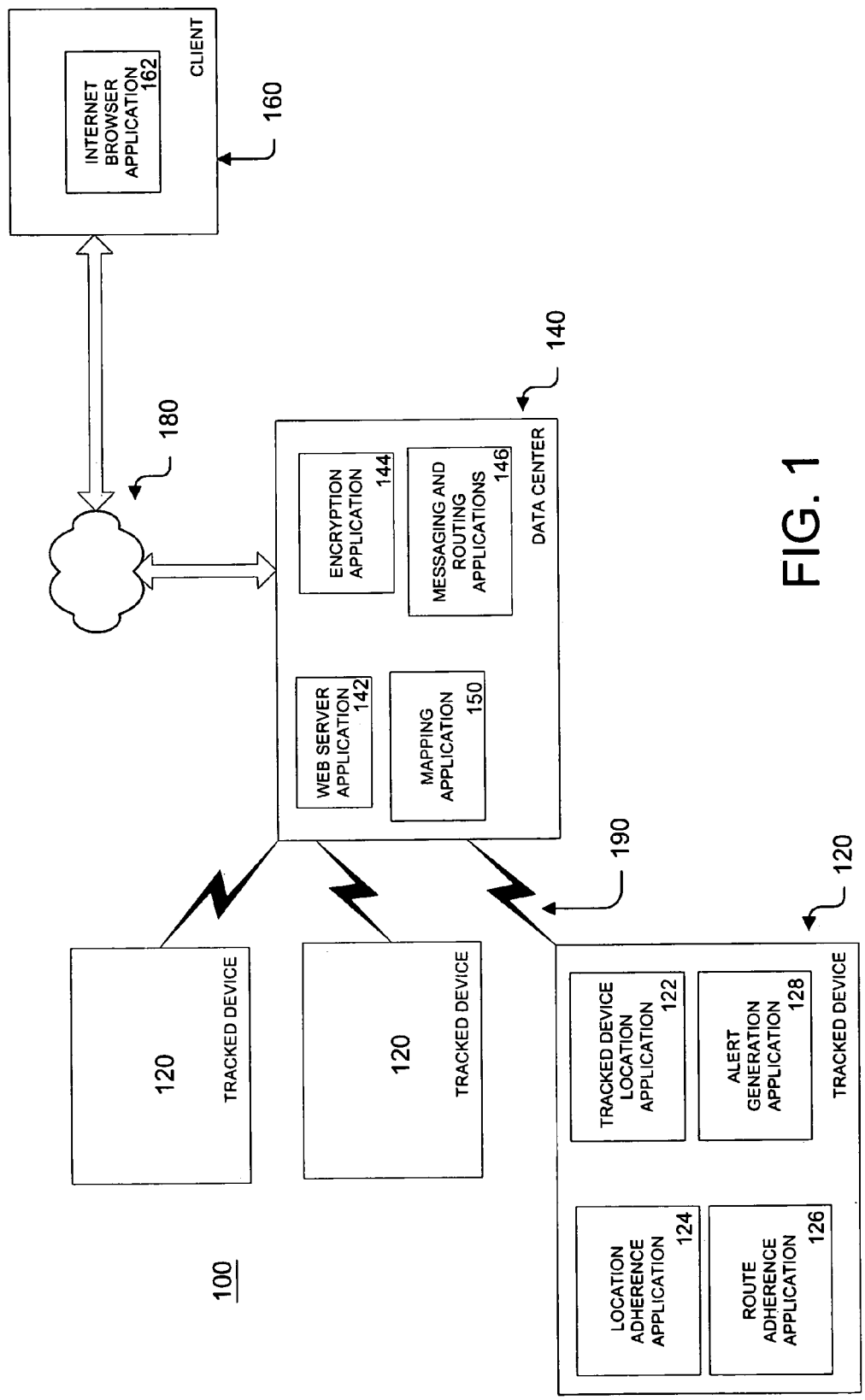
FIG. 1 is a functional block diagram providing an exemplary device tracking system in accordance with the invention.

FIG. 1 depicts a device tracking system 100 and related components in accordance with the present invention. In particular, the device tracking system 100 comprises tracked devices 120, a data center 140, and a client 160. The tracked devices 120 are connected to the data center 140, via links 190. The client 160 is also connected to the data center 140 via link 180.

It should be appreciated that the links 180, connecting the data center 140 to the client 160, can be wired or wireless links or any combination thereof, or any other known or later developed element(s) that is capable of supplying and/or communicating data to and from the connected elements.

It should also be appreciated that, in accordance with the present invention link 190 supporting communication between tracked devices 120 and the data center 140 is wireless. The link 190 can support protocols (e.g., RF communications, the ReFLEX™ paging protocol, etc.) and systems associated with a wireless local area network (LAN) as well as a wireless data network, wireless packet switching, wireless local loop or any other known or later developed wireless element(s) that is capable of supplying and/or communicating data to and from the connected elements.

Additionally, it should be appreciated that while various functional components are illustrated in FIG. 1 and that various other components, such as switches, routers, long distance carriers, firewalls, security components and/or software, or the like, can also be included without affecting the operation of the system.

The client 160 comprises a user located at a workstation operating a computer (discussed with regard to FIG. 9) that includes an internet browser application 162 providing a user with the ability to remotely access, data and applications located at the data center 140. For example, the internet browser application 162 (e.g., HTTP-based, HTTPS-based, etc.) transfers files and data via the web server application 142 in the data center 140. The user, once the mapping application is accessed can remotely create geofence object(s) that can be associated with the one or more tracked devices 120 (e.g., associated with a vehicle such as an automobile, truck or the like) as boundaries for tracking the movements of the tracked device 120. It should also be understood that the client 160 can include multiple individual users located on individual workstations. Additionally, is should be understood that additional clients could also be set up to access the applications provided by the data center 140.

The data center 140 can include various functional applications including, for example, a web server application 142, a data encryption application 144, messaging and routing applications 146 and a mapping application 150.

While the exemplary embodiments illustrated herein show the various components of the data center module 140 co-located, it is to be appreciated that any of the various applications or components described above can be located on one or servers or processors within a distributed network, such as a local area network, a wide area network, a telecommunications network, a dedicated network, an intranet and/or the internet, or within a dedicated secure or unsecured system. It should also be appreciated, that the various components can be combined into one or more devices or co-located on a particular node of a distributed network, such as a telecommunications network.

The web server application 142 can include any suitable web server programming that enables access and data exchange with client 160. For example, the web server application 142 can supply the mapping application 150 in the form of an applet, plug-in, or the like for viewing and/or interaction by a user at client 160. Additionally, while exemplary embodiments of the present invention describe the client device as including an internet browser application and the data center including a web server application, one of ordinary skill would understand that any type of monolithic application could be employed, using suitable protocols, at both the data center and the client, that would enable a client/user to obtain information from data center 140.

The encryption application 144 provides encryption services for the system. For example, an "end-to-end" encryption scheme can provide continuous protection of data that flows between the data center 140 and the tracked device 120, by encrypting any data when it leaves the data center 140, leaving it encrypted while it passes through any intermediate devices (such as any intermediary routers), and decrypting only when the data arrives at the tracked device 120.

The messaging and routing applications 146 enable the sending and receiving of messages, storing of messages and routing of messages to their destination. For example, when routing a message from the tracked device 120 to the data center 140, the messaging applications enable reconfiguration of the message from a wireless protocol to a protocol associated with wired transmission. Furthermore, the routing applications enable determination of the destination address for the message from the tracked device 120 and forward the reconfigured message to the destination.

The mapping application 150 (discussed in more detail with regard to FIG. 2) in accordance with the present invention, can be employed by a user, at client 160, once logged into the data center via the web server 142. Specifically, the user can create geofence objects by using the mapping application 150. A geofence object, discussed in more detail below, is one or more sets of geographic boundaries used to monitor tracked device 120. The mapping application 150 provides geographical maps of locations with which the tracked device 120 may be tracked. The user can then create and edit the specific geofence in accordance with the user's desires.

Once the geofence objects are created, the mapping application 150 resolves the boundaries into a set of coordinates (e.g., longitude and latitude). The coordinates are next associated with a specific tracked device 120, or set of tracked devices. The set of coordinates can then be encrypted through the use of the encryption application 144 and to ensure secure transmission and forwarded through the use of the messaging and routing applications 146 to the associated tracked device 120 for storage and use.

The tracked device module 120 includes a tracked device location application 122, a location adherence application 124, a route adherence application 126, and an alert generation application 128. The tracked device 120, in accordance with an exemplary embodiment of the present invention, is associated with an object that is being tracked. The object being tracked as described in the present invention is a vehicle (e.g., cars, boats, trucks, trains). However, one of ordinary skill in the art would understand that the tracked device of the present invention could be placed on many other objects to be tracked (e.g., shipping containers, people, etc.) without departing from the spirit of the invention.

Figure 9:
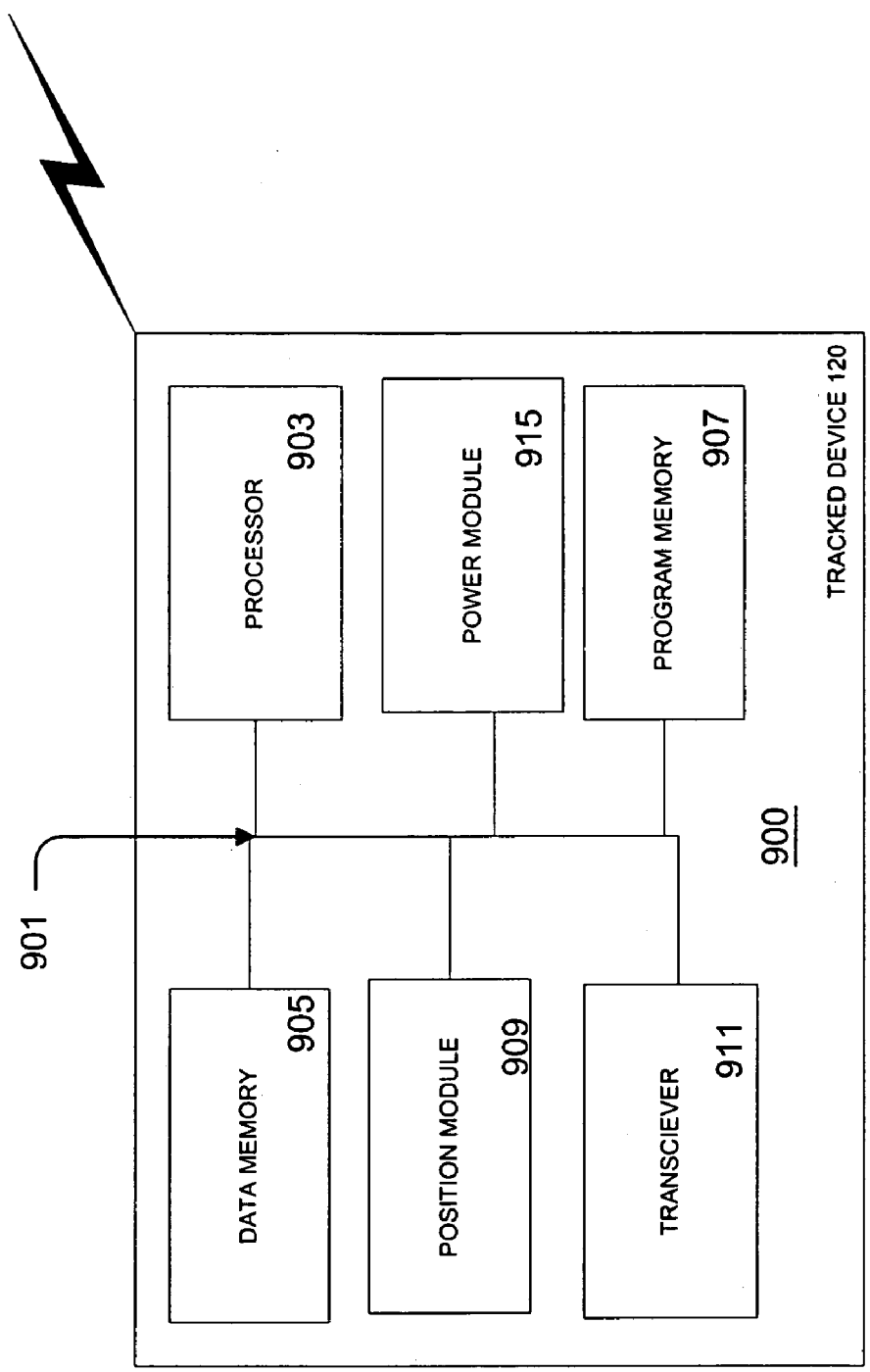
FIG. 9 is a hardware illustration of the tracked device in accordance with an exemplary embodiment of the present invention.

The tracked device location application 122 can be employed in combination with associated tracking hardware (discussed with respect to FIG. 9, to provide an instantaneous position of the tracked device 120. For example, a Global Positioning System (GPS), a triangulation device, or the like could be employed to determine the tracked device's 120 position in coordinates of longitude and latitude. The tracked device location application utilizes the data provided by the hardware system to provide coordinates for use by the tracked device 120.

The location adherence application 124 (discussed in more detail with respect to FIGS. 4–6) is able to utilize the current position of the tracked device 120 obtained by the tracked device location module 122 and the previous status of the tracked device (e.g., located inside or outside a geofence object) to determine whether the tracked device has generated a change in status by moving into a geofence object or out of a geofence object boundary since the last location determination. In accordance with the present invention, if the object has moved into or out of a geofence object, the alert generation application is able to send an alert message to the data center 140.

The route adherence application 126 (discussed in more with regard to FIG. 8) is able to utilize the current position of the tracked device 120 and the previous status of the tracked device (e.g., inside or outside a geofence object) to determine if the tracked device is progressing along a predetermined route of geofence objects. In accordance with the present invention, if the object is determined to not be moving in accordance with the predetermined route of geofence objects, the alert generation application is able to send an alert message to the data center 140.

The alert generation application 128 acts in concert with transmission hardware (discussed in more detail in FIG. 9) to generate and transmit an alert to data center 140 when either the location adherence application 124 or the route adherence application 126 determines that an alert should be sent.

The unique function of the location adherence application 124 and the route adherence application 126 as well as the fact that these applications are located in the tracked device 120 provides a distinct advantage over other tracking systems. Specifically, the processing being performed at the tracked device 120 and alert messages being sent back to the data center 140 only when an alert message is generated, provides a drastic reduction in the transmission of data between the data center 140 and tracked device 120, thereby resulting in smaller network requirements to host the system and reducing costs dramatically.

Figure 2:
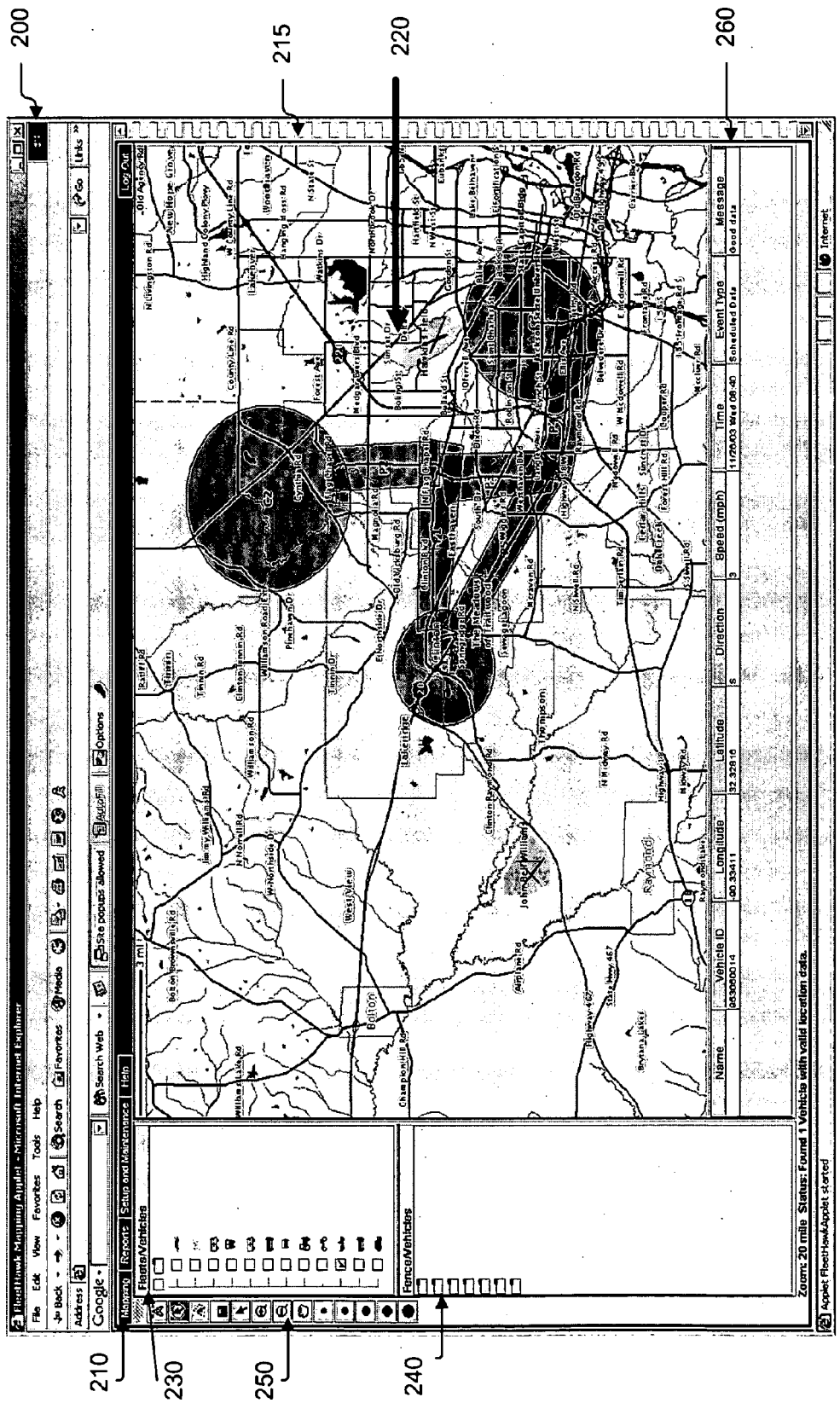
FIG. 2 is an exemplary user interface display provided when accessing the mapping application of the present invention.

FIG. 2 depicts a geofence creation screen 200 presented to the client once the mapping application 150 has been accessed and executed. It should be understood that various securities for authentication and authorization can be employed to ensure that only authorized users are accessing the system. For example, the user interface associated with mapping application 150 can begin with a login screen (not shown) where the user enters a username and a password to gain access. The username and password are used to authenticate the user. Also, one would understand that additional authorization schemes could be set up, for example, so that a specific process or person may only access or modify data that he/she has been authorized to process.

The login screen leads to the geofence creation screen 200. The geofence creation screen 200 has four functional sections: a mapping section 210, a reports section, a setup and maintenance section and a help section. The mapping section 210 includes a geographical map window 215 that includes a geofence map superimposed on a geographical map, a fleet/vehicle window 230, a fence/vehicle window 240, a drawing window 250 and a detail window 260.

The fleet/vehicle window 230 is a display screen showing all vehicles or fleets of vehicles available to be tracked. When one of the vehicles is highlighted (by a check mark located in a box associated with each set of vehicles), more details about the vehicle are shown in detail in detail window 260 located below the geographical map window 215. The detail window 260 shows more specific details regarding the vehicle. For example, the vehicle name, vehicle ID, longitude, latitude, direction, speed, time of last position determination, event type, and message type can be provided.

The fence/vehicle window 230 is a screen showing all vehicles or fleets of vehicles that have been associated with various geofence objects. When one of the vehicles is highlighted, more details about the vehicles and the geofence objects are shown in the detail window 260. The mapping window 215 shows the current geofence objects 220 that are associated with the highlighted vehicle.

A user, located at client 160, is able to utilize the tools located in the drawing window 250 to create geofence objects in the mapping section 210. As discussed in more detail below, the geofence objects can either be circular or polygons and can be grouped in accordance with the user's wishes. As discussed above, once the geofence objects are created, they can be associated with an automobile or a fleet of automobiles listed, for example in the fleet/vehicle section 230 and saved to a database in the data center 140. While the geofence objects described in accordance with the present invention are circles or polygons, one would also understand that other shapes such as ellipses could also be employed to define a geofence object.

While, as described above, the maps, geofence objects and coordinates have been described with respect to two dimensions, it would not be beyond the scope of the present invention to tailor the invention to be used with three-dimensional coordinates. As a result, this would allow for the present invention to be employed with airborne vehicles or even submerged vehicles. In this case, the geofence objects would comprise spheres and polyhedrons. Additionally, other objects such as cones, cylinders and ellipsoids could also be employed.

Figure 3:
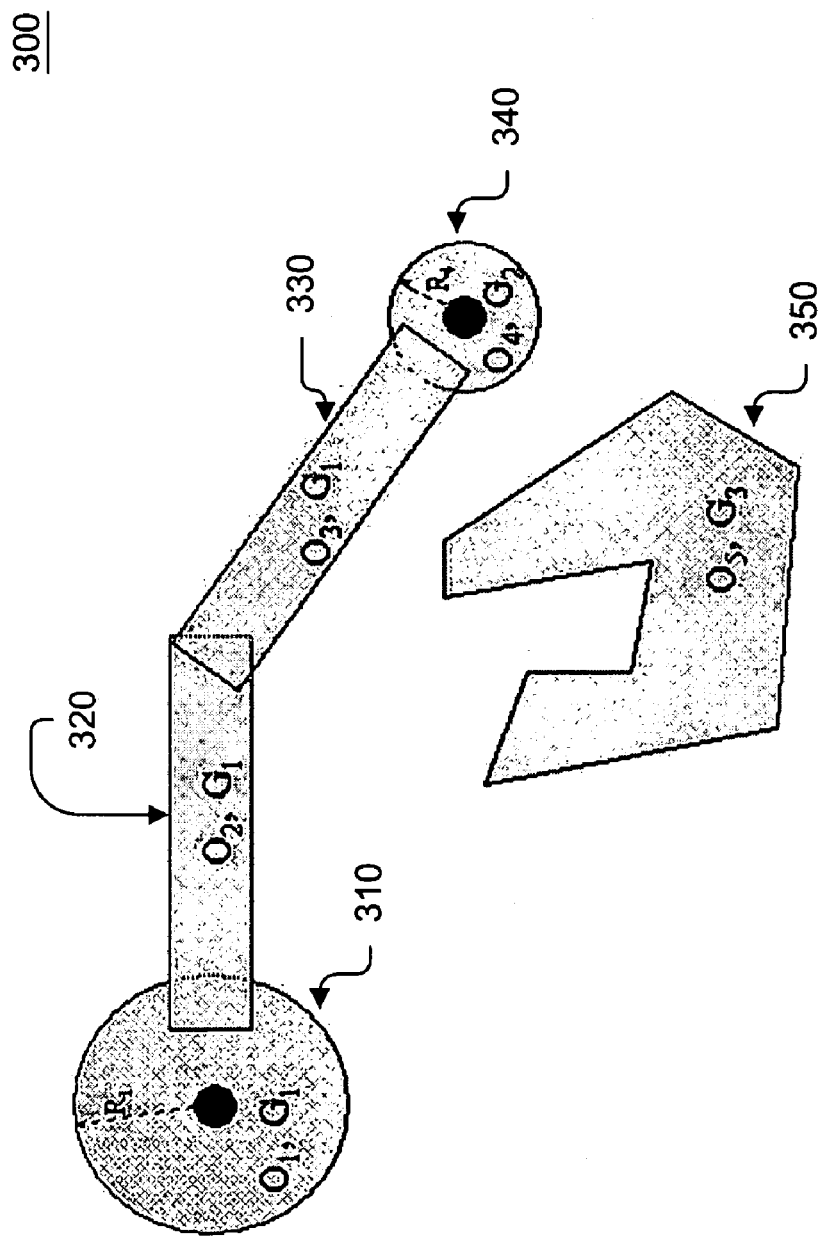
FIG. 3 provides exemplary geofence objects in accordance with exemplary embodiments of the invention.

FIG. 3 depicts an exemplary geofence map 300. The geofence map 300 includes one or more geofence objects 310–350 that provide geographical boundaries from which movements of the tracked device 120 can be monitored. In accordance with the present invention, geofence objects can include circles (e.g., objects 310 and 340) as well as polygons (e.g., objects 320, 330 and 350) that can be created in a separate, stand-alone, manner or can be grouped together in various combinations of objects.

When geofence objects are deployed in a separate or stand alone fashion and employed to track devices, a status change, in accordance with the present invention, is deemed to occur when a tracked device moves from being inside a geofence object to being outside a geofence object or from being outside a geofence object to being inside a geofence object. For example, if a tracked device were to move from geofence object 350 to geofence object 340, a status change would occur when the tracked device, that had previously been inside geofence object 350 exits the object's boundaries. Also, upon entering geofence object 340, a status change would occur when the tracked device, that had previously been outside geofence object 340 enters the boundaries of the geofence object 340. In yet another example, if a tracked device were to move from geofence object 320 to geofence object 330 directly, then a status change would occur when entering geofence object 330 then a status change would occur when the tracked device exits geofence object 320.

In accordance with another embodiment of the present invention, the user can decide to group two or more geofence objects together in any manner deemed appropriate by the user. When object grouping is employed, the two or more geofence objects are interpreted to be a single (larger) geofence object. As a result, different status changes can occur than those possible when the same geofence objects are treated separately. For example, if geofence elements 310, 320, 330 and 340 are grouped together no status changes occur when a tracked device moves from element 320 to 330. This result is much different than when the same geofence objects are not grouped together as discussed above.

Figure 4:
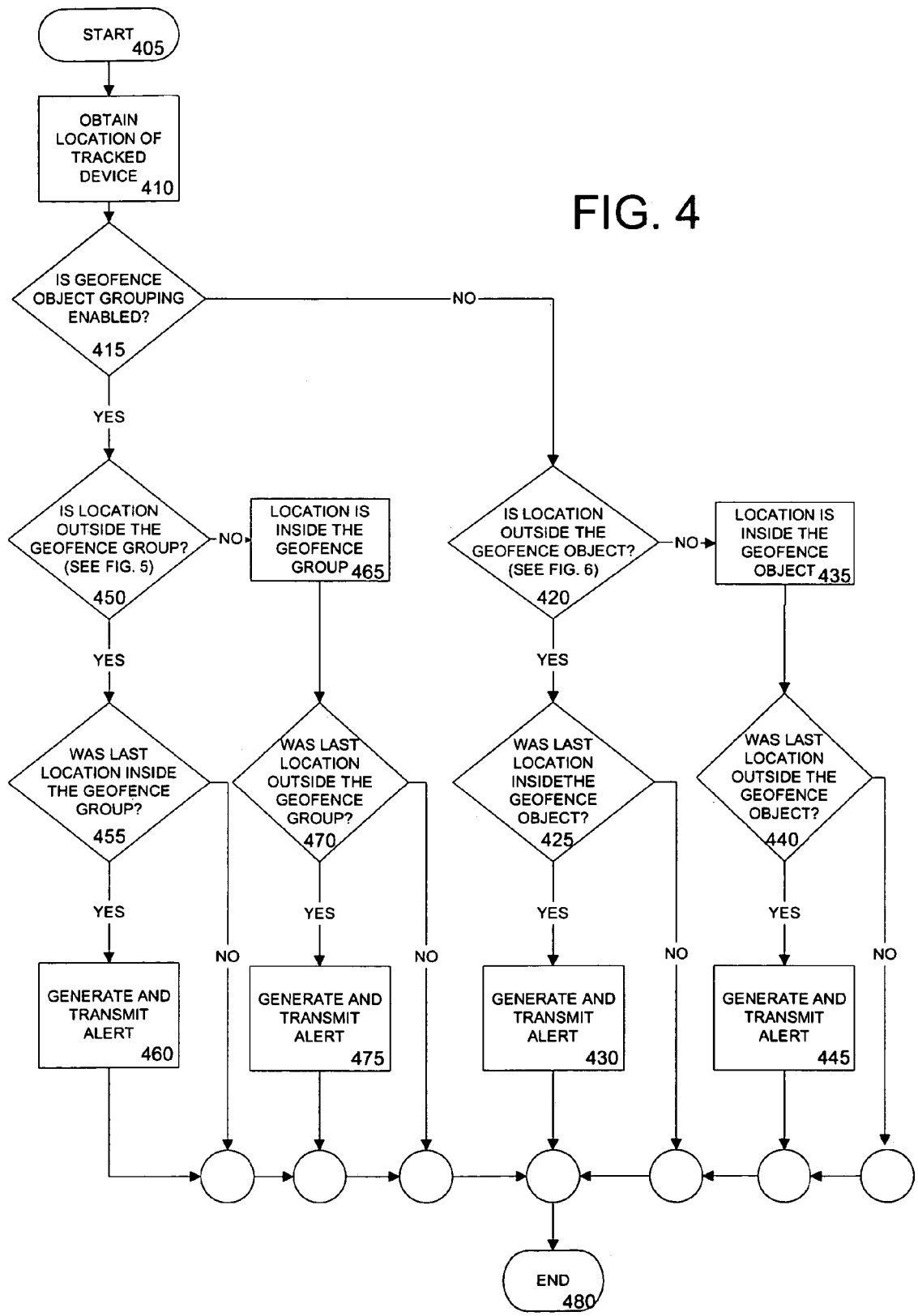
FIGS. 4–6 is are flowcharts illustrating the location adherence application in accordance with exemplary embodiments of the present invention.

FIG. 4 presents a flow diagram depicting the function of the location adherence application 124, in accordance with exemplary embodiments of the present invention. In step 405 the process begins. In step 410, the location of the tracked device is obtained. As discussed above, the tracked device location application obtains the geographical location of device 120 and translates the location into an appropriate coordinate system. In accordance with the present invention, GPS can be used to obtain the necessary geographical coordinates. In step 415, the system determines whether geofence object grouping has been enabled or not.

If geofence object grouping has been enabled, the process determines whether the location of the tracked device is outside the geofence group, in step 450. This step is described in more detail with reference to FIG. 5.

If the location of the device is determined to be outside of the geofence group then, in step 455, a determination is made as to whether the previous status of the tracked device indicated it was inside the geofence group. If the last location was inside the geofence group, then the tracked device has moved from inside a geofence group to outside a geofence group. In accordance with the present invention, the occurrence of such a change in status (from inside the geofence group to outside the geofence group) can be transmitted to the data center 140. In step 460, an alert is generated by the alert generation mechanism 128 and a message, including the alert, is sent to the data center 140. If, however, no status change has taken place, the application ends in step 480.

If the device is determined in step 450 not to be outside the geofence group, then in step 465 the location of the tracked device is thus inside the geofence group. Next, in step 470, a determination is made as to whether the previous location was outside the geofence group. If the last location was inside the geofence group, then the application concludes that the tracked device has not changed status and has stayed within the geofence group. Thus, the application ends in step 480. If however, the last location was outside the geofence group, then the application concludes that the tracked device has changed status by moving inside a geofence group and, in step 475, generates and transmits an alert message to the data center 140.

If geofence object grouping has not been enabled as determined in step 415, the process determines whether the location is outside the geofence object, in step 420. This step is described in more detail with reference to FIG. 6.

If the location is determined to be outside the geofence object, in step 420, a determination is made as to whether the previous status of the tracked device indicated it was inside the geofence object, in step 425. If the last location was inside the geofence object, then the tracked device has moved from outside a geofence object to inside a geofence object. In accordance with the present invention, the occurrence of such a change in status (from outside the geofence object to inside the geofence object) can be transmitted to the data center. In step 430, an alert is generated by the alert generation mechanism 128 and a message, including the alert, is sent to the data center 140. If however, no status change has taken place, the application ends in step 480.

If the location is not determined to be outside the geofence object, in step 420 then the location of the geofence object is determined to be inside the geofence object in step 435. Next, in step 440, a determination is made as to whether the previous location was outside the geofence object. If the last location was inside the geofence object, then the application concludes that the tracked device has not changed status and has stayed within the geofence object. Thus, the application ends in step 480. If however, the last location was outside the geofence object, then the application concludes that the tracked device has changed status by moving inside a geofence object and, in step 445, generates and transmits an alert message to the data center 140.

Figure 5:
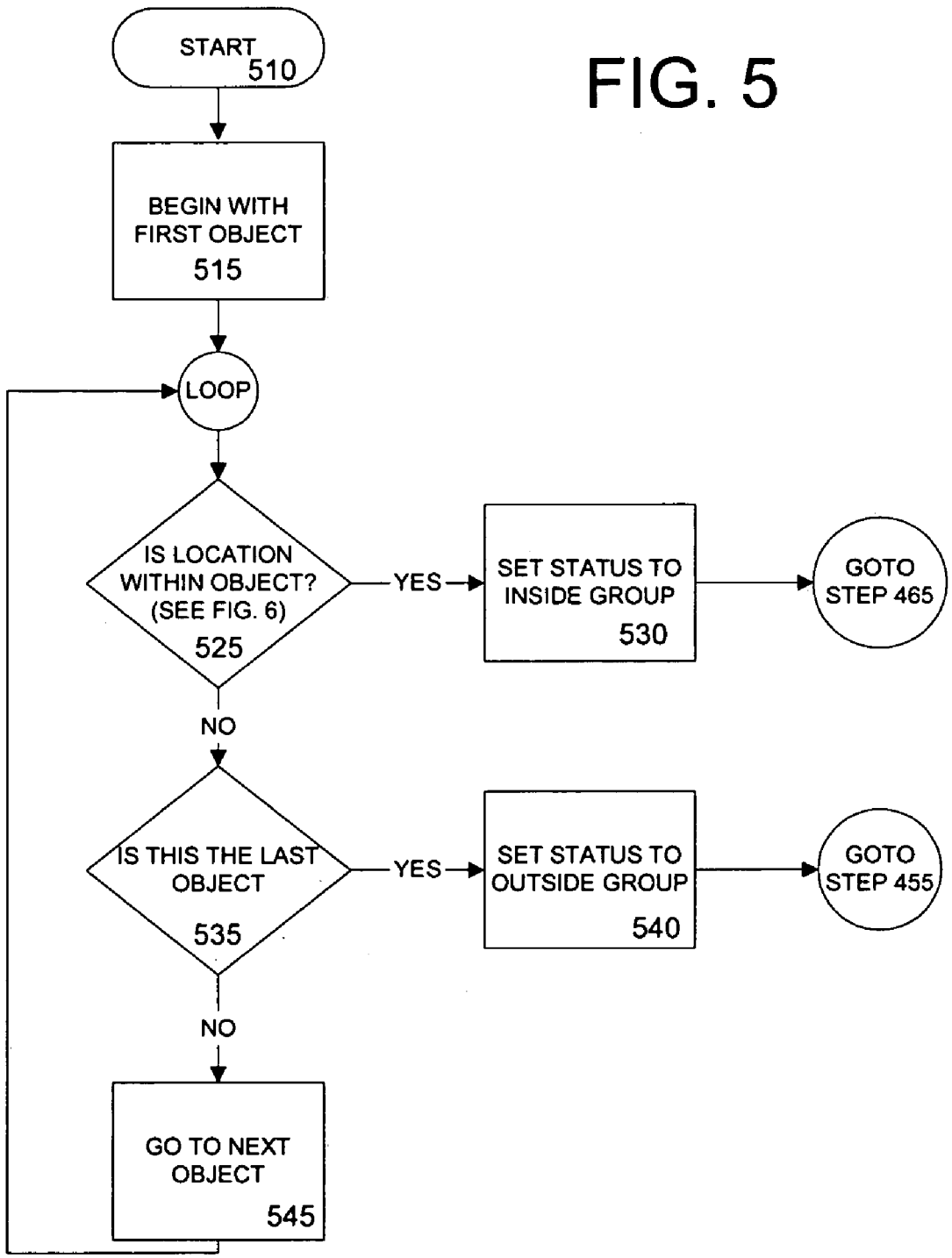

FIG. 5 presents a flow diagram illustrating the determination of whether the location of the tracked device is outside a geofence group as determined in step 450 of FIG. 4. The routine begins at step 510 and, in step 515, a first geofence object within a geofence group is selected. Next, in step 525, a determination is made as to whether the location of the tracked device is within the selected geofence object. Additional details of step 525 are discussed with respect to FIG. 6, below. If the location of the tracked device 120 is within the geofence object then the status of the tracked device is set to be inside of the group in step 530. The process then returns to step 465 in FIG. 4. On the other hand, if the tracked object is determined not to be within the selected geofence object, then, in step 535, a determination is made whether the selected object is the last geofence object in the group. If it is the last object in the group, the process returns to step 455 in FIG. 4. Otherwise, the next object is selected in step 545 and the process is repeated until either the location of the tracked device is determined to be inside the selected object or no more objects are listed within the geofence group. If all objects have been selected and the tracked device is not inside the group, the status is set to outside the geofence group in step 540 and the process returns to step 455 in FIG. 4.

Figure 6:
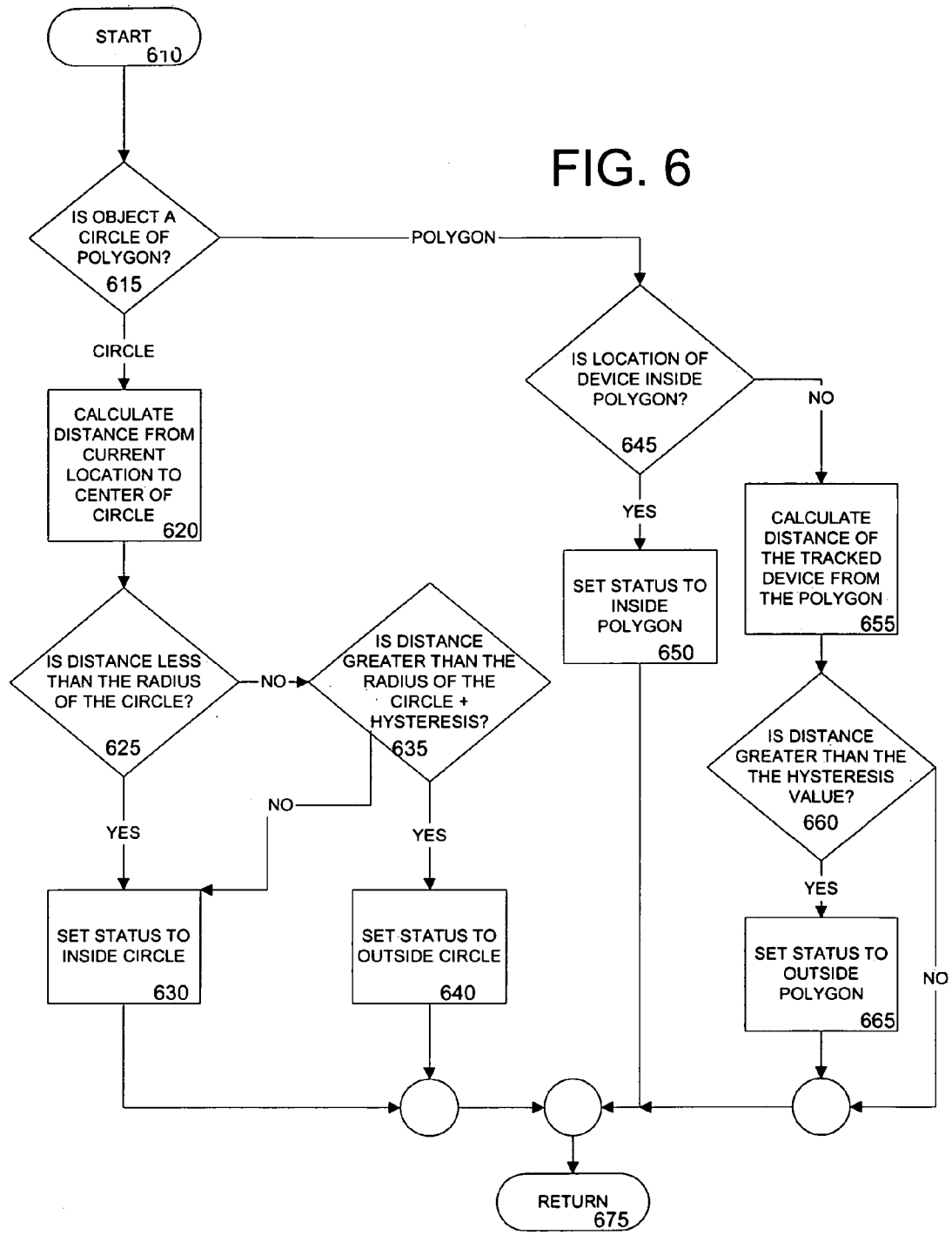

FIG. 6 provides a flow diagram illustrating the determination of whether the location of the tracked device is within an object as determined in step 420 of FIG. 4 and step 525 of FIG. 5. The routine begins at step 610 and, in step 615, a determination is made as to whether the geofence object is a circle or polygon.

If the geofence object is a circle then, in step 620, the distance from the tracked device's current location to the center of the circle is calculated. This is done by determining the distance from the coordinates representing the position of the tracked device to the coordinates representing the center of the circle. Next, in step 625, a determination is made as to whether the distance from the tracked device to the center of the circle is less than the radius of the circular geofence object. If the distance is less than the radius then the status is set to inside the circle in step 630. If however, the distance is not less than the radius of the circle in step 625, an additional determination is made as to whether the distance is greater than the radius of the circle plus a hysteresis buffer added to the boundary of the geofence object in step 635. The buffer is discussed in more detail with regard to FIG. 7. If the distance of the tracked device from the center of the circle is greater than the radius of the circle plus a hysteresis then the status is set to outside the circular geofence object in step 640, otherwise the status is set to inside circle in step 630. Based upon the results from this determination flow, in step 675 the process returns to step 420 of FIG. 4 or step 525 of FIG. 5.

If the geofence object is a polygon then, in step 645, a determination is made as to whether the tracked device 120 is located inside the polygon. As briefly discussed above, this is done by comparing the boundaries of the polygon with the location of the tracked device. If the location of the tracked device is determined to be inside the polygon, the status of the tracked device is set to be inside the polygon in step 650. If however, the device is determined to be outside the polygon, in step 655, the distance of the tracked device to the polygon is calculated. Next, in step 660 a determination is made as to whether the distance calculated is greater than the hysteresis. If the distance of the tracked device is greater than the hysteresis value then the status is set to outside the polygon geofence object in step 665, otherwise the status is set to inside circle in step 650. Based upon the results from this determination flow, in step 675, the process returns to step 420 of FIG. 4 or step 525 of FIG. 5.

The use of hysteresis described briefly above is an attempt to limit the number of alert messages generated and sent from the tracked device 120 to the data center 140. Due to slight variations in location measurement readings, and to variations in software calculations, as well as environmental conditions such as weather, an exemplary embodiment of the present invention employs the use of hysteresis to account for these small variations/errors. The hysteresis adds a small buffer area to the normal geographic boundary of a geofence object in order to ensure that erroneous alert messages are not received from a tracked device located near or on the outer edge of a geofence object.

Figure 7A:
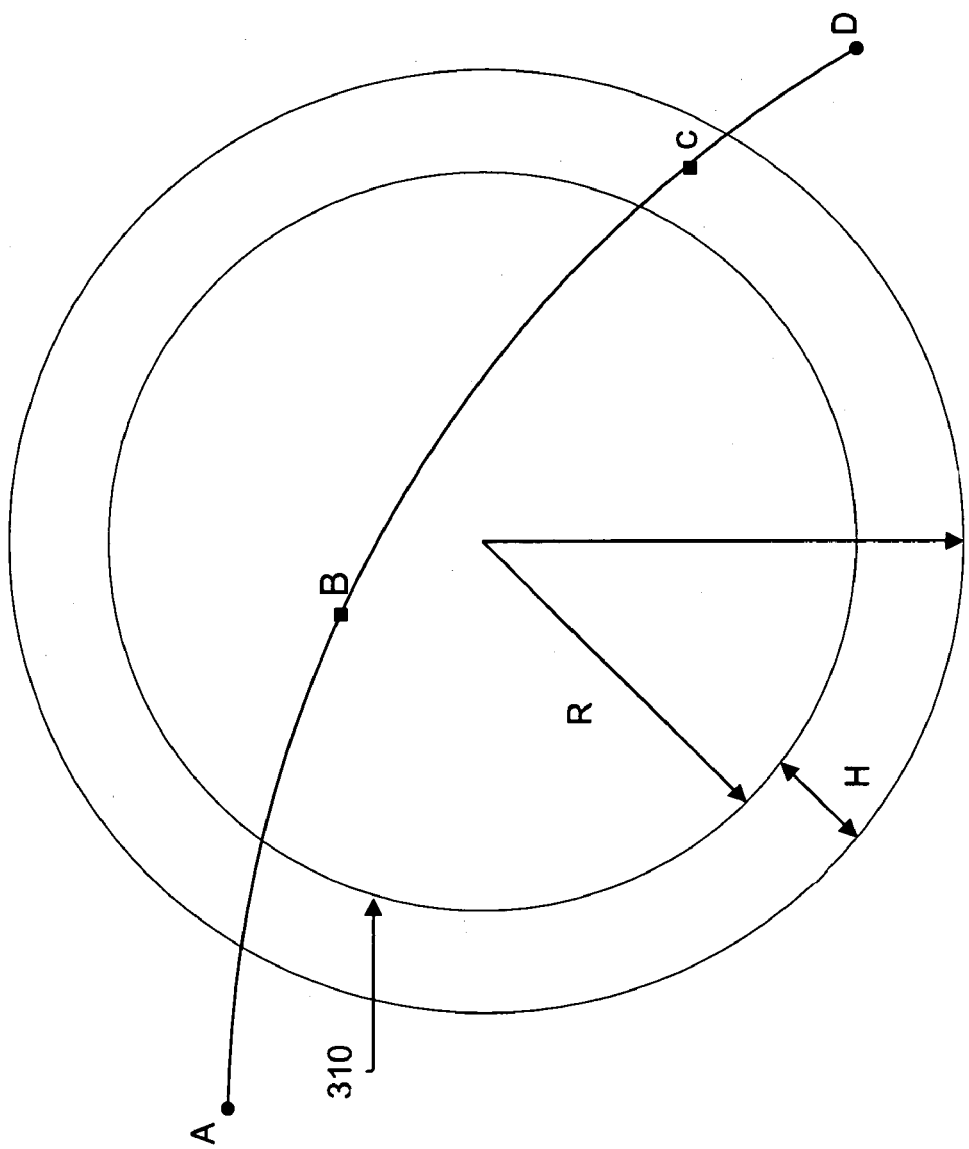
FIG. 7A-7C show exemplary geofence objects and the determination of the distance from the objects to a point outside the objects' boundary with regard to hysteresis, in accordance with the present invention.

FIG. 7A depicts circular geofence 310. The circular geofence 310, already discussed above with respect to FIG. 3, has a radius of R and a hysteresis value of H. A description follows with regard to an exemplary tracked device's position and status at points A, B, C and D at four successive times.

At point A, the tracked device is outside the geofence object. At point B the tracked object is located inside the geographical boundaries of geofence object 310. In accordance with exemplary embodiments of the invention described above, an alert message is generated and sent to the data center 160. At point C, the location of the tracked object is outside the geofence object 310. At this point, however, the distance that the tracked device is located outside the geofence is calculated to determine whether the location of the tracked device is inside or outside the area defined by the hysteresis. With regard to a circular geofence, the distance from the center of the geofence to the location of the tracked device is calculated and compared to the distance from the center of the geofence to the radius R of the circle plus the area encompassed by the hysteresis, H.

At point C the tracked device is located within the area defined by distance from the center of the geofence to the radius R of the circle plus the area encompassed by the hysteresis, H. As a result, no alert will be generated by the tracked device. However, at point D, the tracked device is located outside both the geofence object and the additional area provided by the hysteresis. Thus, in accordance with the present invention, an alert will be generated.

Figure 7B:
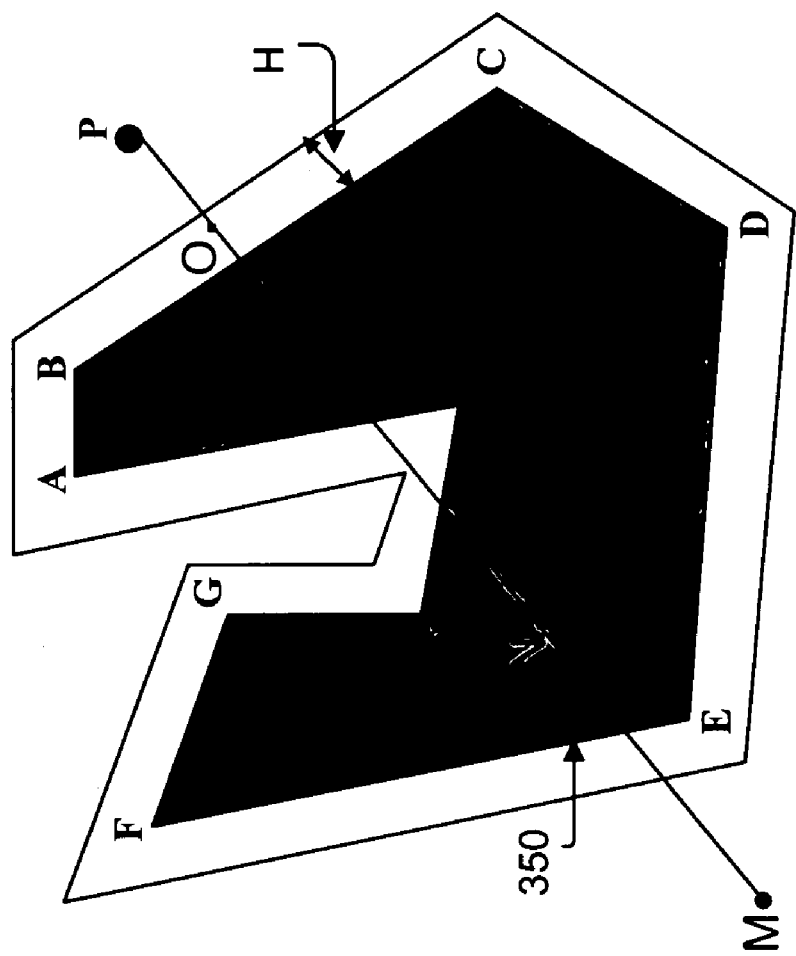

FIG. 7B depicts an polygon geofence 350, discussed above with respect to FIG. 3. The polygon geofence 250 includes an area represented by a hysteresis, H, surrounding the boundary of the geofence object 250. A description follows with regard to a tracked device's position at points M, N, O and P at four successive times. At point M, the tracked device is determined to be outside the geofence object 350. At point N, the tracked object is located inside the geofence object 250. In accordance with exemplary embodiments of the invention described above, an alert message is generated and sent to the data center 140. At point O, the location of the tracked object is outside the geofence object 250. At this point, it is necessary to determine whether the tracked device is located outside the geofence area and the additional area provided by the hysteresis.

Figure 7C:
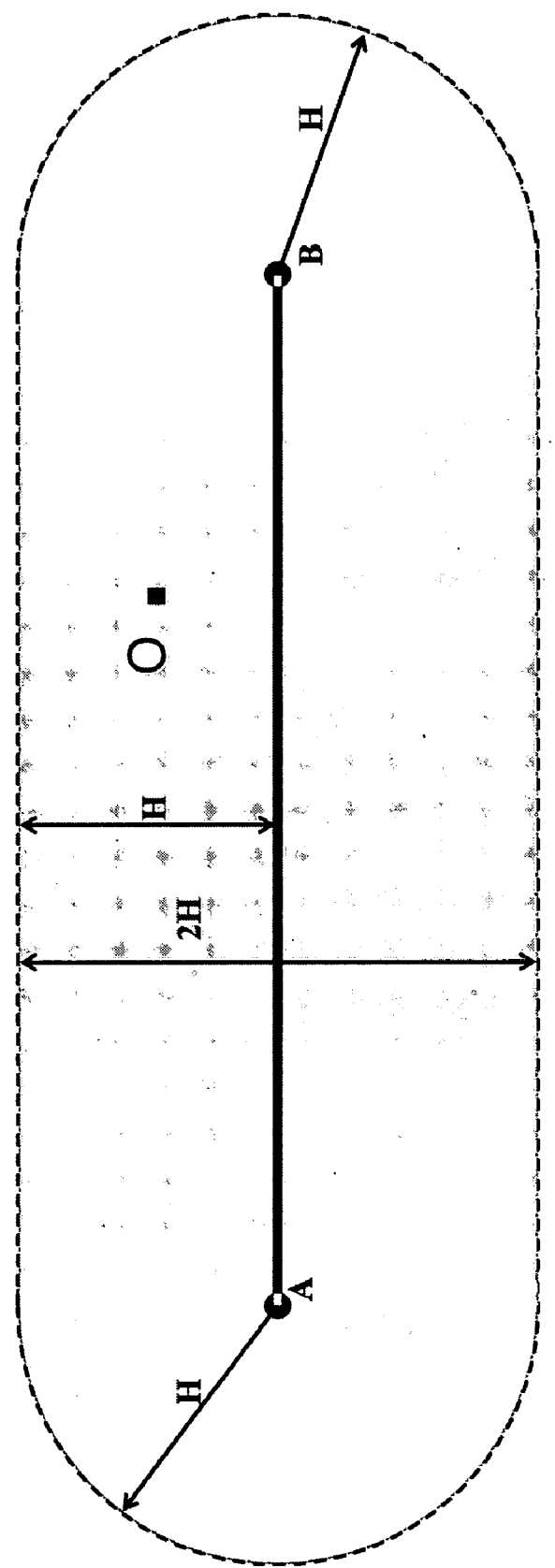

With regard to the polygon depicted in FIG. 7B, each of the line segments of the polygon is individually analyzed to determine whether point O is within a hysteresis buffer area as depicted in FIG. 7C. The hysteresis buffer area for each line segment includes the area above and below the line segment to a height of the hysteresis, H, between end points A and B. Beyond endpoints A and B the buffer area is determined as if each of the endpoints is the center of a circle with a radius H. If the location of the tracked device is located in any of the buffer areas of any line segment in the polygon, then it is determined to reside within the predetermined area defined by the hysteresis value H.

Turning back to FIG. 7B, at point O the tracked device is located within the predetermined area defined by the hysteresis value, H. Thus, no alert will be generated by the tracked device, at this time. However, at point P, the tracked device is located outside both the geofence object and the additional area provided by the hysteresis, H. Thus, in accordance with the present invention, an alert will be generated.

In accordance with another aspect of the present invention, the tracked device may also be tracked in accordance with a route adherence application 126. This application enables the tracked device 120 to be monitored as it traverses a specific route of geofence objects. As an example, referring to FIG. 3, a tracked device 120 can be assigned a route from geofence object 310 through geofence objects 320 and 330 to geofence object 340. Exemplary embodiments of the present invention enable the tracking of a device to ensure that it follows the route in the specified order.

FIG. 8. presents a flow diagram illustrating a route tracking application in accordance with the present invention. In step 810 the process begins. In step 820, an ordered list of N geofence objects is retrieved, where a specific route order for the geofences is provided (n=1 . . . N). In step 830 the location of a tracked device is obtained.

Next, in step 840, a determination is made as to whether the tracked device is located in the first geofence object. Referring back to FIG. 3 and the route from geofence object 310 to geofence object 340, step 840 ensures that the object is within the first geofence in the ordered list. If the tracked device is not located in the first geofence object, an alert is generated in step 850 and another location of the tracked device is obtained. An alert will continue to be generated with each location determination until an the tracked device has entered the first geofence object in the ordered list has been entered.

If the tracked device is located with the first geofence object as determined in step 840, in step 860 a determination is made as to whether the tracked device has exited the geofence object (n). If it has not exited, then a the location is obtained in step 865 and the system determines whether the device has exited geofence object n until it is determined that the tracked object has left geofence object (n). In other words, once inside the first geofence object, the tracked device is merely being monitored to determine if it has exited the geofence object.

Once the object has left geofence object n a determination is made in step 870 if the tracked device has entered geofence object n+1. If not, in step 872, an alert message is generated and sent to the data center 140 as the tracked device is no longer on route. If, however, the tracked device has entered the next geofence object, a determination is made as to whether the current geofence object is the last object in the route, in step 875. If so, the route is indicated as being finished in step 885 and an alert message is can be sent indicating that the destination geofence object has been reached. If not, in step 880, the next geofence object on the ordered list is determined and the next location of the tracked device in step 885 is obtained to begin the same analysis again.

The tracked device 120 can be implemented using one or more general purpose computer systems, microprocessors, digital signal processors, micro-controllers, etc., programmed according to the teachings of the embodiments of the present invention (e.g., using the computer system of FIG. 9) Appropriate software implementing the function described above can be readily prepared by programmers of ordinary skill based on the teachings of the present disclosure, as will be appreciated by those skilled in the software art.

FIG. 9 illustrates an exemplary hardware computer system 700 employed within the tracked device 120. The computer system 900 can include a bus 901 or other communication mechanism for communicating information, and a processor 903 coupled to the bus 901 for processing the information. The computer system 900 also can include a data memory 905, such as a random access memory (RAM), other dynamic storage devices (e.g., dynamic RAM (DRAM), static RAM (SRAM), synchronous DRAM (SDRAM)), flash memory, etc., coupled to the bus 901 for storing information and instructions to be executed by the processor 903.

In addition, the main memory 905 also can be used for storing temporary variables or other intermediate information during the execution of instructions by the processor 903. The computer system 900 further can include a program memory 907 or other static storage device (e.g., programmable ROM (PROM), erasable PROM (EPROM), electrically erasable PROM (EEPROM), flash memory, etc.) coupled to the bus 901 for storing static information and instructions.

The tracked device is able to obtain its position through the use of the position module 909. The position module is able to employ various techniques (e.g., GPS and triangulation) to obtain the position of the tracked device 120.

The tracked device is also able to communicate with the data center 140 through the use of a transceiver 911. In accordance with exemplary embodiments of the present invention, the transceiver 911 uses a chosen communications protocol to communicate wirelessly with the data center, for example. Such communications protocols include (but are not limited to) ReFLEX™, etc. Since the tracked device is a stand alone mechanism, it includes a power module 950 which is able to provide power to the tracked device. It should be understood that the power module is capable of receiving power in a variety of configurations. For example, an internal battery or an external power source with an internal back-up battery could be employed.

Figure 10:
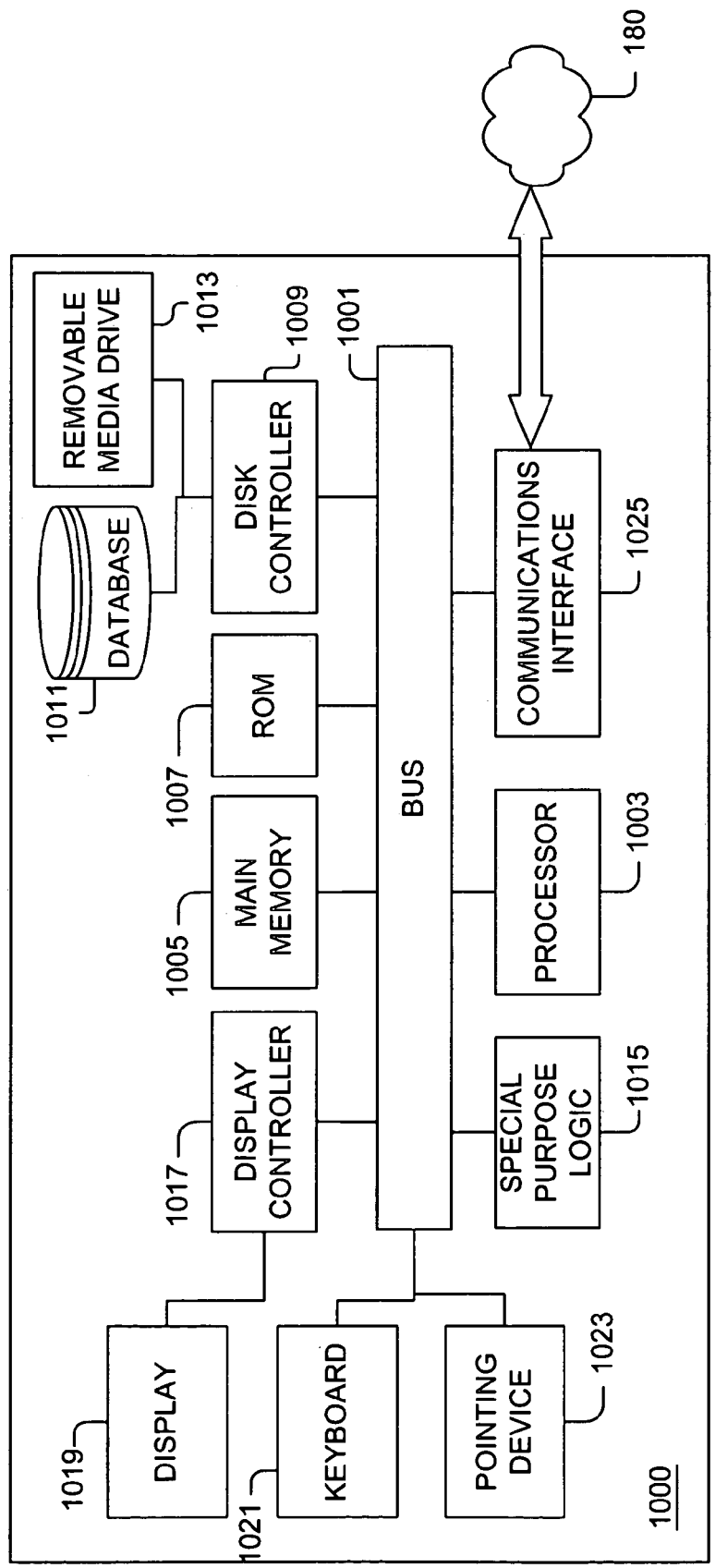
FIG. 10 is a computer system upon which variously described elements of the present invention can be implemented.

FIG. 10 illustrates a computer system 1000 upon which the described embodiments of the data center 140 and the client 160 can be implemented. The various embodiments can be implemented on a single such computer system, or a collection of multiple such computer systems. The computer system 1000 can include a bus 1001 or other communication mechanism for communicating information, and a processor 1003 coupled to the bus 1001 for processing the information. The computer system 1000 also can include a main memory 1005, such as a random access memory (RAM), other dynamic storage device (e.g., dynamic RAM (DRAM), static RAM (SRAM), synchronous DRAM (SDRAM)), etc., coupled to the bus 1001 for storing information and instructions to be executed by the processor 1003.

In addition, the main memory 1005 also can be used for storing temporary variables or other intermediate information during the execution of instructions by the processor 1003. The computer system 1000 further can include a ROM 1007 or other static storage device (e.g., programmable ROM (PROM), erasable PROM (EPROM), electrically erasable PROM (EEPROM), etc.) coupled to the bus 1001 for storing static information and instructions.

The computer system 1000 also can include a disk controller 1009 coupled to the bus 1001 to control one or more storage devices for storing information and instructions, such as a magnetic hard disk 1011, and a removable media drive 1013 (e.g., floppy disk drive, read-only compact disc drive, read/write compact disc drive, compact disc jukebox, tape drive, and removable magneto-optical drive). The storage devices can be added to the computer system 1000 using an appropriate device interface (e.g., small computer system interface (SCSI), integrated device electronics (IDE), enhanced-IDE (E-IDE), direct memory access (DMA), or ultra-DMA).

The computer system 1000 also can include special purpose logic devices 1015, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, communications functions, etc.

The computer system 1000 also can include a display controller 1017 coupled to the bus 1001 to control a display 1019, such as a cathode ray tube (CRT), liquid crystal display (LCD), active matrix display, plasma display, touch display, etc., for displaying or conveying information to a computer user. The computer system can include input devices, such as a keyboard 1021 including alphanumeric and other keys and a pointing device 1023, for interacting with a computer user and providing information to the processor 1003. The pointing device 1023 can include, for example, a mouse, a trackball, a pointing stick, etc., or voice recognition processor, etc., for communicating direction information and command selections to the processor 1003 and for controlling cursor movement on the display 1019.

The computer system 1000 can perform assigned processing steps of the invention in response to the processor 1003 executing one or more sequences of one or more instructions contained in a memory, such as the main memory 1005. Such instructions can be read into the main memory 1005 from another computer readable medium, such as the hard disk 1011 or the removable media drive 1013. Execution of the arrangement of instructions contained in the main memory 1005 causes the processor 1003 to perform the process steps described herein. One or more processors in a multi-processing arrangement also can be employed to execute the sequences of instructions contained in the main memory 1005. In alternative embodiments, hard-wired circuitry can be used in place of or in combination with software instructions. Thus, embodiments are not limited to any specific combination of hardware circuitry and/or software.

With regard to the systems described in FIGS. 9 and 10, stored on any one or on a combination of computer readable media, the embodiments of the present invention can include software for controlling each respective computer system, for driving a device or devices for implementing the invention. Such software can include, but is not limited to, device drivers, firmware, operating systems, development tools, applications software, etc. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

As discussed generally above, with respect to FIG. 1, the computer system 1000 also can include a communication interface 1025 coupled to the bus 1001. The communication interface 1025 can provide a two-way data communication coupling via a link 180.

The term "computer readable medium" as used herein can refer to any medium that participates in providing instructions to the processor 1003 for execution. Such a medium can take many forms, including but not limited to, non-volatile media, volatile media, transmission media, etc. Non-volatile media can include, for example, optical or magnetic disks, magneto-optical disks, etc., such as the hard disk 1011 or the removable media drive 1013. Volatile media can include dynamic memory, etc., such as the main memory 1005. Various forms of computer-readable media can be involved in providing instructions to a processor for execution. For example, the instructions for carrying out at least part of the embodiments of the present invention can initially be borne on a magnetic disk of a remote computer connected to link 180.

While the present invention has been described in connection with a number of embodiments and implementations, the present invention is not so limited but rather covers various modifications and equivalent arrangements, which fall within the purview of the appended claims.

Each of the following applications is incorporated by reference in its entirety: U.S. patent application Ser. No. 10/759,406, filed Jan. 16, 2004, entitled "Method and System for Scheduling of Data Retrieval from Mobile Telemetry Devices"; U.S. patent application Ser. No. 10/758,770, filed Jan. 16, 2004, entitled "Method and System for Tracking Mobile Telemetry Devices"; U.S. patent application Ser. No. 10/758,769, filed Jan. 16, 2004, entitled "Method and System for Remotely Configuring Mobile Telemetry Devices"; U.S. patent application Ser. No. 10/758,768, filed Jan. 16, 2004, entitled "Method and System for Mobile Telemetry Device Prioritized Messaging"; U.S. patent application Ser. No. 10/758,930, filed Jan. 16, 2004, entitled "Method and System for Interfacing with Mobile Telemetry Devices"; U.S. patent application Ser. No. 10/759,404, filed Jan. 16, 2004, entitled "Method and System for Transmitting Assistance Location Data for Fleet and Asset Management"; and U.S. patent application Ser. No. 10/758,199, filed Jan. 16, 2004, entitled "Method and System for Secured Wireless Data Transmission to and from a Remote Device"; the entireties of which are incorporated herein by reference.

What is claimed is:

1. A method for performing location analysis within a tracked device, comprising:

receiving, at the tracked device, a set of coordinates associated with a boundary area;

obtaining, at the tracked device, a position of the tracked device;

determining, based upon the received coordinates and the detected position of the tracked device, whether the tracked device is located inside the boundary area or outside the boundary area, wherein the set of coordinates include a hysteresis value that adds a predetermined area to the outer periphery of the boundary area once the tracked device is determined to be inside the boundary area; and generating and transmitting an alert signal if the result of the determining step is different from an immediately previous result obtained.

2. The method of claim 1, wherein the boundary is a geo-fence boundary comprising a combination of circles and polygons.

3. The method of claim 1 wherein the alert signal is an exit alert if the result is that the tracked device is located outside the boundary area and the previous result is that the tracked device is located inside the boundary area.

4. The method of claim 1, wherein the alert signal is an entry alert if the result is that the tracked device is located inside the boundary area and the previous result is that the tracked device is located outside the boundary area.

5. The method of claim 1, wherein the generating and transmission of an alert signal will not occur until the location of the tracked device is determined to be outside the added predetermined area on the periphery of the boundary area.

6. A method for performing route progress analysis within a tracked device, comprising:

receiving, at the tracked device, a plurality of sets of coordinates associated with a plurality of boundary areas, wherein the plurality of sets of coordinates have a predetermined order; and obtaining, at the tracked device, a position of the tracked device;

determining, based upon the predetermined order of the sets of coordinates and the detected position of the tracked device, whether the tracked device is progressing through the plurality of boundary areas in accordance with the predetermined order, wherein the coordinates include a hysteresis value that adds a predetermined area to the outer periphery of the boundary areas once the tracked device is determined to be inside the boundary areas; and generating and transmitting an alert signal if the tracked device is not progressing though the in accordance with the predetermined order.

7. The method of claim 6, wherein the boundary areas are geo-fence boundaries comprising a combination of circles and polygons.

8. The method of claim 6, wherein an alert is generated if, at the time of an initial determination of progress, the tracked device is not located in the first boundary area.

9. The method of claim 7, further comprising:

generating an alert message if the last geofence boundary in the predetermined order has been entered.

10. A method of remotely tracking a tracked device, comprising:

receiving boundary information;

sending said boundary information to the tracked device;

receiving an alert from the tracked device regarding the location of the tracked device, wherein the boundary information includes coordinates that define geo-fence boundaries comprising a combination of circles and polygons, the boundary information further includes a hysteresis value specifying a buffer area to the boundaries.

11. A tracked device for performing location analysis, comprising:

means for receiving a set of coordinates associated with a boundary area; and means for obtaining a position of the tracked device and storing the position;

means for determining, based upon the received coordinates and a detected position, whether the tracked device is located inside the boundary area or outside the boundary area, wherein the set of coordinates include a hysteresis value that adds a predetermined area to the outer periphery of the boundary area once the tracked device is determined to be inside the boundary area; and means for generating and transmitting an alert signal if the result is different from an immediately previous result obtained.

12. The method of claim 11, wherein the boundary is a geo-fence boundary comprising a combination of circles and polygons.

13. The method of claim 11, wherein the alert signal is an exit alert if the result is that the tracked device located outside the boundary area and the previous result is that the tracked device is located inside the boundary area.

14. The method of claim 11, wherein the alert signal is an entry alert if the result is that the tracked device is located inside the boundary area and the previous result is that the tracked device is located outside the boundary area.

15. The method of claim 11, wherein the generating and transmission of an alert signal will not occur until the location of the tracked device is determined to be outside the added predetermined area on the periphery of the boundary area.

16. An apparatus for performing route progress analysis within a tracked device, comprising:

means for receiving, at the tracked device, a plurality of sets of coordinates associated with a plurality of boundary areas, wherein the plurality of sets of coordinates have a predetermined order; and means for obtaining, at the tracked device, a position of the tracked device and storing the position in a database;

means for determining, based upon the predetermined order of the sets of coordinates and the detected position of the tracked device, whether the tracked device is progressing through the plurality of boundary areas in accordance with the predetermined order, wherein the coordinates include a hysteresis value that adds a predetermined area to the outer periphery of the boundary areas once the tracked device is determined to be inside the boundary areas; and means for generating and transmitting an alert signal if the tracked device is not progressing though the in accordance with the predetermined order.

17. The apparatus of claim 16, wherein the boundary areas are geo-fence boundaries comprising a combination of circles and polygons.

18. The apparatus of claim 17, wherein an alert is generated if, at the time of an initial determination of progress, the tracked device is not located in the first boundary area.

19. The apparatus of claim 17, further comprising:

means for generating an alert message if the last geofence boundary in the predetermined order has been entered.

20. An apparatus for remotely tracking a tracked device, comprising:

means for receiving boundary information;

means for sending said boundary information to a tracked device;

means for receiving an alert from the tracked device regarding the location of the tracked device, wherein the boundary information includes coordinates that define geo-fence boundaries comprising a combination of circles and polygons, the boundary information further includes a hysteresis value specifying a buffer area to the boundaries.

* * * * *